(12) United States Patent
Hasegawa et al.

(10) Patent No.: US 11,505,253 B2
(45) Date of Patent: Nov. 22, 2022

(54) VEHICLE BODY STRUCTURE

(71) Applicant: HONDA MOTOR CO., LTD., Tokyo (JP)

(72) Inventors: Atsushi Hasegawa, Wako (JP); Takayuki Fujii, Wako (JP); Yumi Saito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/213,876

(22) Filed: Mar. 26, 2021

(65) Prior Publication Data

US 2021/0300475 A1    Sep. 30, 2021

(30) Foreign Application Priority Data

Mar. 31, 2020    (JP) .............................. JP2020-062846

(51) Int. Cl.
*B62D 21/15* (2006.01)
*B62D 25/04* (2006.01)
*B62D 25/02* (2006.01)

(52) U.S. Cl.
CPC ......... *B62D 21/157* (2013.01); *B62D 25/025* (2013.01); *B62D 25/04* (2013.01)

(58) Field of Classification Search
CPC ...... B62D 25/025; B62D 25/04; B62D 25/02; B62D 21/157
USPC .... 296/187.12, 193.06, 29, 30, 209, 203.01, 296/203.03
See application file for complete search history.

(56) References Cited

U.S. PATENT DOCUMENTS 3,913,707 A * 10/1975 Wastenson .............. F16F 7/125
  293/133
7,237,832 B2   7/2007 Saeki
9,199,592 B1 * 12/2015 Nusier .................... B60R 19/34

FOREIGN PATENT DOCUMENTS

| CN | 207790589 U | * | 8/2018 |
| JP | 4470494 B2 | | 6/2010 |
| JP | 2019-127046 A | | 8/2019 |

* cited by examiner

*Primary Examiner* — Dennis H Pedder
(74) *Attorney, Agent, or Firm* — Rankin, Hill & Clark LLP (57) ABSTRACT

Provided is a vehicle body structure in which when a load acts on an impactor, the impactor is moved toward an inner wall, a slider is moved along the inner wall by means of direction-changing unit, and in the case where the load acting on a crushing member via the slider exceeds a set value, the moving slider crushes the crushing member.

11 Claims, 8 Drawing Sheets

VEHICLE BODY STRUCTURE

CROSS-REFERENCE TO RELATED APPLICATION

The present application claims the benefit of priority to Japanese Patent Application No. 2020-062846 filed on Mar. 31, 2020, the disclosures of all of which are hereby incorporated by reference in their entireties.

TECHNICAL FIELD

The present invention relates to a vehicle body structure capable of absorbing an excessive load inputted from the outside.

RELATED ART

To protect the occupants in the passenger compartment from the shock caused by a collision or the like, efforts have been made such as disposing a shock absorbing structure to absorb the shock, a skeleton structure configured not to be deformed by the shock to keep the internal space in the passenger compartment, and the like at various portions in the vehicle body.

For example, Japanese Patent No. 4470494 (patent document 1) proposes a structure in which the center pillar itself moves to the passenger compartment side, which crushes an intermediate deformation allowance portion, thereby absorbing the collision load inputted from a side of the vehicle body.

Japanese Patent Application Publication No. 2019-127046 (patent document 2) also proposes a structure that, when a collision load is inputted from a side of the vehicle body, reduces the degree of movement of a pillar trim to the passenger compartment side, caused along with the movement of the center pillar to the passenger compartment side.

SUMMARY

In the structure in patent document 1, since a function of the shock absorbing structure is added to the skeleton structure, when a skeleton member absorbs a shock, the skeleton member is deformed while being moved to the passenger compartment side.

Thus, it is not really a structure to fully satisfy the purpose of protecting the occupants in the passenger compartment. The structure of patent document 2 is for releasing the engagement between the pillar trim and the center pillar and thus is not a structure to absorb a side collision load or to generate a reaction force.

Hence, the structure of patent document 2 has a problem that when an excessive load is inputted, it is not possible to prevent the pillar body from getting into the passenger compartment.

The present invention has been made in light of the foregoing points, and an object thereof is to provide a vehicle body structure capable of, when an excessive load is inputted into the vehicle body from the outside, absorbing the load while reducing the degree of the displacement to the passenger compartment side.

To achieve the object, a vehicle body structure according to the present invention includes: a skeleton recessed portion that is formed on a surface of a skeleton member of a vehicle body by a standing wall standing along a vehicle inside-outside direction and an inner wall connecting to a vehicle-inside edge of the standing wall and has a recessed shape with an approximately L-shaped cross section; an impactor configured to be displaced in a direction from an opening of the skeleton recessed portion toward the inner wall; a slider configured to be displaced toward the standing wall and be in sliding contact with the impactor; direction-changing unit including an inclined surface at at least one of sliding-contact parts of the impactor and the slider configured to be in sliding contact with each other, the inclined surface obliquely intersecting the two directions of a displacement direction of the impactor and a displacement direction of the slider; and a crushing member disposed between the slider and the standing wall and configured to crush in a case where a load exceeding a set value is inputted to the crushing member, and when a load acts on the impactor, the impactor moves toward the inner wall, the slider moves toward the crushing member by means of the direction-changing unit, and in a case where a load acting on the crushing member via the slider exceeds the set value, the crushing member is crushed by the moving slider.

The present invention makes it possible to provide a vehicle body structure capable of, when an excessive load is inputted into the vehicle body from the outside, absorbing the load while reducing the degree of the displacement to the passenger compartment side.

DETAILED DESCRIPTION

A vehicle body structure S1 according to an embodiment of the present invention will be described in detail with reference to the drawings. In the description, the same constituents are denoted by the same symbols, and repetitive description thereof is omitted.

Figure 1:
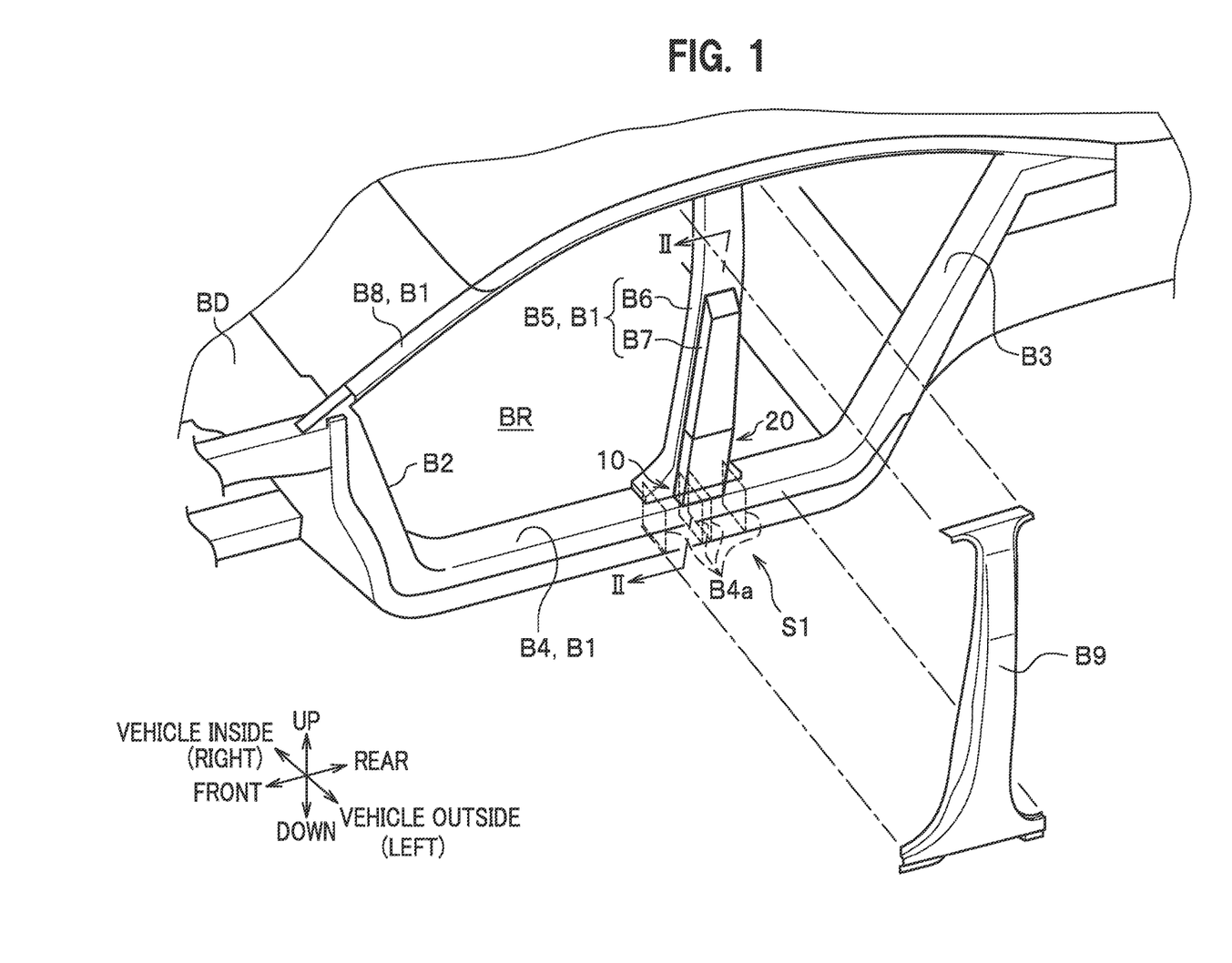
FIG. 1 is a perspective view of a vehicle frame in which a vehicle body structure of a first embodiment is applied to a center pillar.

The vehicle body structure S1 of the present embodiment is a structure to protect the occupants in the vehicle compartment in case where a collision occurs at a side of the vehicle body (side collision), and this structure is disposed at a joint portion between a side sill B4 and a center pillar B5 (see FIG. 1).

The vehicle body structure S1 of the present embodiment includes a skeleton recessed portion 10 and a crushing mechanism 20 disposed in the skeleton recessed portion 10.

Description will be made in the order of the skeleton recessed portion 10 and the crushing mechanism 20.

The skeleton recessed portion 10, as illustrated in FIG. 1, is formed at the joint portion between the side sill B4 and the center pillar B5, and thus, descriptions will be given of the side sill B4 and the center pillar B5.

The side sill B4 is a part of a skeletal frame member B1 serving as a skeletal frame of a vehicle body BD and is formed in the form of a tube, in which bulkheads B4a are disposed at specified intervals.

The bulkhead B4a, which is a plate member orthogonal to a horizontal plane and which faces are directed in the front-rear direction, is a reinforcing member to reinforce the side sill B4.

The side sill B4, located at a side edge portion of the vehicle-body floor and extending along the vehicle front-rear direction, serves as a lower edge portion of the vehicle-body side opening.

In other words, the side sill B4 extends along a horizontal plane.

The side sill B4 has a relatively high stiffness compared to the other portions of the skeletal frame member B1.

The center pillar B5 is a part of the skeletal frame member B1 serving as the skeletal frame of the vehicle body BD.

The center pillar B5, extending in the vehicle up-down direction and connecting the side sill B4 and a side roof rail B8, divides the vehicle-body side opening into a front-seat-side opening B2 and a rear-seat-side opening B3.

In other words, the center pillar B5 stands upward from the side sill B4.

The side roof rail B8 is a part of the skeletal frame member B1 serving as an upper edge portion of the vehicle-body side opening, in other words, a side edge portion of the vehicle-body ceiling portion.

The center pillar B5 includes an inner pillar B6, an outer pillar B7, and an outer member B9.

The inner pillar B6 connects the side sill B4 and the side roof rail B8.

The outer pillar B7 is disposed on the outside surface of the inner pillar B6, facing the outside in the vehicle width direction.

The stiffness of the outer pillar B7 is set such that in the case where a load larger than a set value is inputted from the outside, the outer pillar B7 will crush to absorb the shock.

Specifically, the inner pillar B6 serves as a skeleton portion of the center pillar B5, and the outer pillar B7 serves as a shock absorbing portion of the center pillar B5.

In the case where a load larger than a set value is inputted into the center pillar B5 from the outside, the outer pillar B7 crushes to absorb the load, and the inner pillar B6 protects the passenger compartment BR to protect the occupants.

The outer member B9 serves as an exterior material that covers the outside surface of the center pillar B5 (an upper part of the inner pillar B6, the outer pillar B7, the skeleton recessed portion 10, and the crushing mechanism 20) (see FIG. 1).

Thus, the outer member B9 is formed using a plate member and disposed on the outside surface (vehicle outside side surface) of the center pillar B5, facing the outside in the vehicle width direction.

The skeleton recessed portion 10 is formed at the joint portion between the side sill B4 and the center pillar B5 described above.

Figure 2:
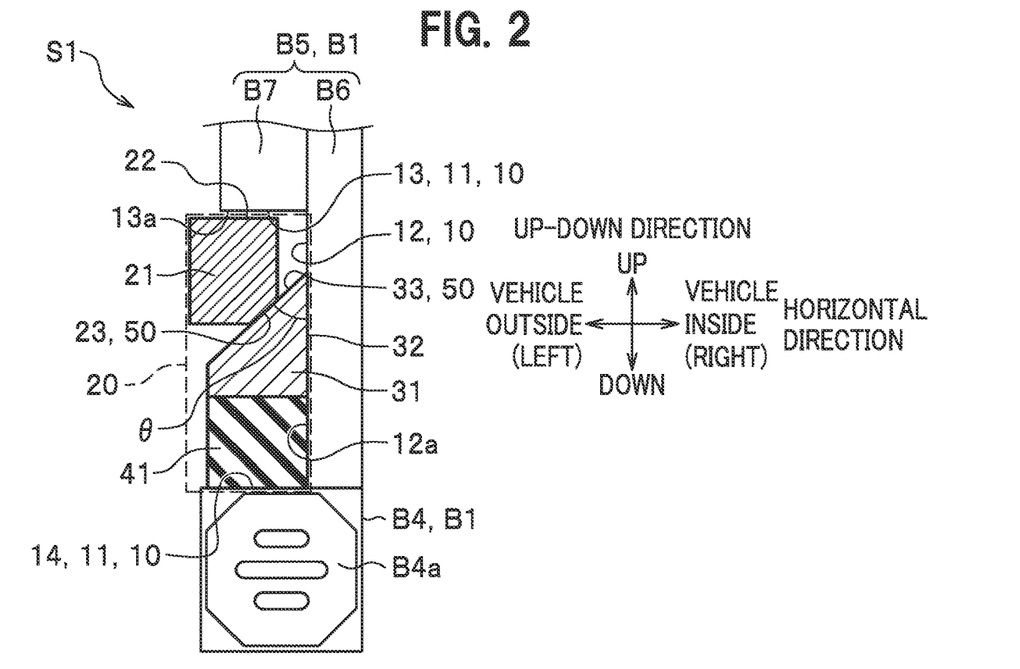
FIG. 2 is a cross-sectional view along line II-II in FIG. 1.
Figure 3:
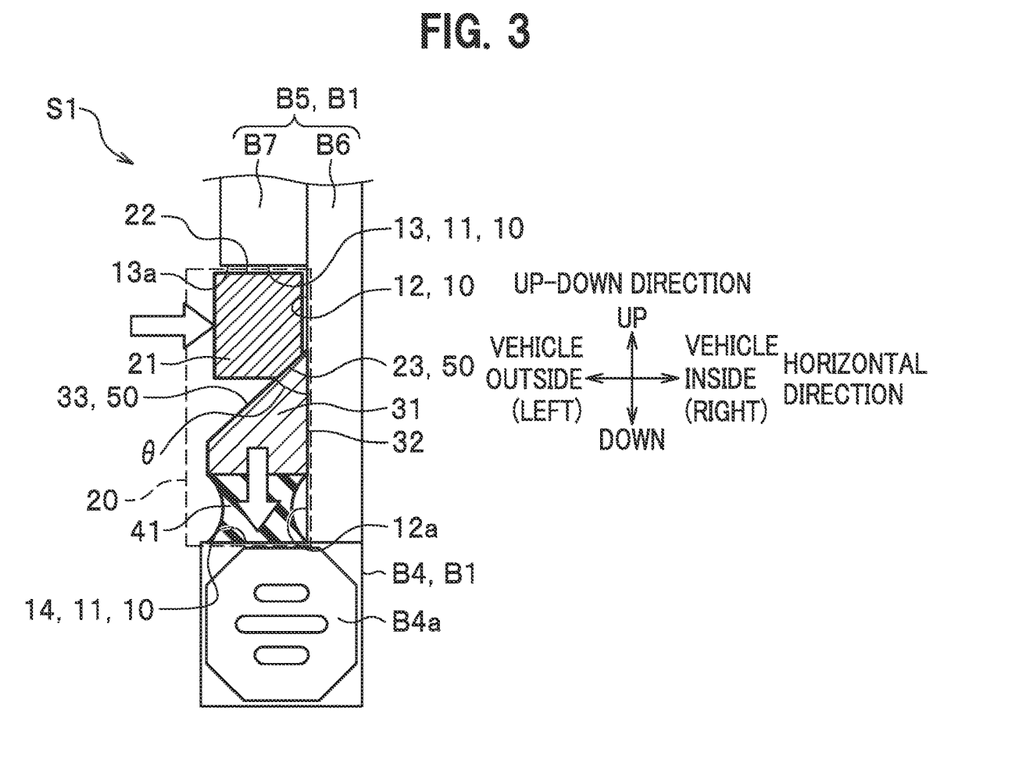
FIG. 3 is a cross-sectional view when an excessive load is inputted from the outside to the state in FIG. 2.

The skeleton recessed portion 10 is positioned on the outside of the inner pillar B6 and at a gap portion between the lower end of the outer pillar B7 and the upper surface of the side sill B4 (see FIGS. 1 to 3).

Specifically, the skeleton recessed portion 10 has a recessed shape having an approximately L-shaped cross section, formed by a lower standing wall 14 (standing wall) standing along the vehicle inside-outside direction and an inner wall 12 connecting to the vehicle-inside edge of the lower standing wall 14.

Further paraphrasing this configuration, the skeleton recessed portion 10 is formed by a pair of opposing walls 11 standing along the vehicle inside-outside direction and facing each other and the inner wall 12 connecting the edges of both opposing walls 11 and has an approximately U-shaped cross section. The skeleton recessed portion 10 is oriented such that the approximately U-shaped cross section is open toward the outside of the vehicle body.

As for the skeleton recessed portion 10, an upper standing wall 13 which is one of the pair of opposing walls 11 is the lower end surface of the outer pillar B7.

The upper standing wall 13 stands along a horizontal plane so that the wall surface of the upper standing wall 13 extends along the vehicle inside-outside direction.

The inner wall 12 is the outside surface of the inner pillar B6.

The lower standing wall 14 (standing wall) which is the other one of the pair of opposing walls 11 is the upper surface of the side sill B4.

Specifically, the lower standing wall 14 stands along a horizontal plane so that the wall surface of the lower standing wall 14 extends along the vehicle inside-outside direction. The stiffness of the outer pillar B7 is set such that in the case where a load larger than a set value is inputted from the outside, the outer pillar B7 can crush to absorb the shock.

Inside the tube of the side sill B4 at the portion that serves as the lower standing wall 14 is provided a bulkhead B4a (see FIGS. 1 and 2).

In other words, the upper standing wall 13 and the inner wall 12 are parts of the center pillar B5, and the lower standing wall 14 (standing wall) is a part of the side sill B4.

The upper standing wall 13 and the lower standing wall 14 are in parallel along a horizontal plane and face each other.

Next, a description will be given of the crushing mechanism 20 disposed in the foregoing the skeleton recessed portion 10.

The crushing mechanism 20 includes an impactor 21, a slider 31, and a crushing member 41.

The crushing mechanism 20 includes a direction-changing unit 50 between the impactor 21 and the slider 31.

The impactor 21 is fixed on the inner surface of the outer member B9. When a load is inputted to the outer member B9 in a direction from the vehicle outside to the vehicle inside, the outer member B9 is deformed in a vehicle inside direction, and at the same time, the impactor 21 is displaced in a vehicle inside direction.

Specifically, the impactor 21 can be displaced along the vehicle inside-outside direction on the wall surface of the upper standing wall 13 (the upper-standing-wall wall surface 13a) in a direction from the opening of the skeleton recessed portion toward the inner wall 12, but the impactor 21 cannot be displaced in the vehicle front-rear direction.

Paraphrasing this configuration, the impactor 21 can be displaced from the outside toward the inside along the vehicle width direction (the vehicle inside-outside direction).

The stiffness of the impactor 21 is set to be higher than the crushing member 41.

The impactor 21 has a wedge shape tapered toward the inner wall 12 formed by an impactor sliding surface 22 and an impactor inclined surface 23.

The impactor sliding surface 22 is in parallel with the direction from the opening of the skeleton recessed portion toward the inner wall 12 (the vehicle inside-outside direction) and faces the upper standing wall 13.

The impactor sliding surface 22 extends along the direction from the opening of the skeleton recessed portion 10 toward the inner wall 12.

In other words, the impactor sliding surface 22 is a flat surface in parallel with a horizontal plane and the wall surface of the lower standing wall 14.

The impactor inclined surface 23 has a flat plane that obliquely intersects the two planes of the impactor sliding surface 22 (the upper-standing-wall wall surface) and the wall surface of the inner wall 12 (the inner-wall wall surface 12a) and that is in parallel with the line of intersection of these two planes.

In other words, the impactor inclined surface 23 has a plane that obliquely intersects the two directions, the direction in which a load is inputted from the outside and the direction of the load after the acting direction of the force is changed.

The slider 31 is movable downward on the wall surface of the inner wall 12 (the inner-wall wall surface 12a) but cannot be displaced in the vehicle front-rear direction.

In other words, the slider 31 can be displaced on the inner wall 12 in the direction from the upper standing wall 13 toward the lower standing wall 14 (standing wall).

The stiffness of the slider 31 is set to a degree approximately the same as that of the impactor 21.

The slider 31 has a wedge shape tapered toward the upper standing wall 13, formed by a slider sliding surface 32 and a slider inclined surface 33.

The slider sliding surface 32 is in parallel with the direction from the upper standing wall 13 toward the lower standing wall 14 and faces the inner wall 12.

In other words, the slider sliding surface 32 is a flat surface extending along the direction from the upper standing wall 13 toward the lower standing wall 14 and in parallel with the inner-wall wall surface 12a.

The slider inclined surface 33 has a flat plane that obliquely intersects the two planes of the slider sliding surface 32 (inner-wall wall surface 12a) and the upper-standing-wall wall surface 13a and that is in parallel with the line of intersection of these two planes.

In other words, the slider inclined surface 33 has a plane that obliquely intersects the two directions, the direction in which a load is inputted from the outside and the direction of the load after the acting direction of the force is changed.

The direction-changing unit 50 includes the impactor inclined surface 23 and the slider inclined surface 33.

The angles (inclination angles) of the slider inclined surface 33 and the impactor inclined surface 23 with respect to the inner-wall wall surface 12a are set to be the same in the state where the crushing mechanism 20 is disposed in the skeleton recessed portion 10.

Thus, the slider inclined surface 33 and the impactor inclined surface 23 are in sliding contact with each other without a gap in between.

With this configuration as described above, the direction-changing unit 50 has an action of force direction change from part of the load inputted into the vehicle body into a force in the direction along the inner-wall wall surface 12a.

The crushing member 41 is sandwiched between the end surface on the lower-standing-wall side of the slider 31 and the lower standing wall 14.

In other words, the crushing member 41 is located on the lower standing wall 14 (standing wall) which is the standing wall toward which the slider 31 moves.

The crushing member 41, when the slider 31 moves in the direction from the upper standing wall to the lower standing wall, is crushed by the slider 31.

For this reason, the stiffness of the crushing member is set to be lower than those of the impactor 21 and the slider 31.

Also, the stiffness of the crushing member 41 is set to be lower than that of the outer pillar B7.

Further, the stiffness of the crushing member 41 is set such that the crushing member 41 will crush when a load exceeding a specified set value is inputted.

The crushing member 41 is a box-shaped member having a closed cross section in vehicle top view.

This configuration provides a required crushing way when the crushing member 41 crushes.

Note that the required crushing way of the crushing member 41 is different depending on the assumed collision condition. Thus, the configuration of the crushing member 41 is set according to the required crushing way.

In other words, the configuration of the crushing member 41 is not limited to box shapes having a closed cross section, but various shapes and configurations can be adopted depending on the required stiffness and the required crushing way.

Next, a description will be given of the action of the vehicle body structure S1 of the present embodiment for the case where a side collision or the like inputs an excessive load into the vehicle body BD (see FIGS. 1 to 3).

FIG. 2 illustrates the vehicle body structure S1 in the initial state. The initial state means the state in which the crushing mechanism 20 is attached to the skeleton recessed portion 10, in other words, the state of the vehicle body structure S1 before the vehicle body structure S1 functions, or before the external force is inputted.

Assume that a side collision or the like inputs an excessive load into the vehicle body structure S1 in the initial state as described above along a horizontal direction from the outside of the vehicle, from the left side to the right side in the figure (from the outside to the inside of the vehicle body).

The inputted load acts on the impactor 21 via the outer member B9.

Receiving the inputted load, the impactor 21 is displaced on the wall surface of the upper standing wall 13 along a horizontal direction in the direction from the opening of the skeleton recessed portion 10 toward the inner wall 12 (the vehicle inside-outside direction).

The impactor 21 being displaced toward the inner wall 12 seeks to move in an obliquely upper right direction in the figure because the impactor inclined surface 23 slides on the slider inclined surface 33.

However, the upward movement of the impactor 21 is restricted because the impactor 21 is fixed on the outer member B9.

Thus, the impactor 21, due to the external load, moves toward the inner wall in a horizontal direction and pushes away the slider inclined surface 33 (slider 31) downward.

Since the slider inclined surface 33 is pushed away downward, the slider 31 is displaced in the direction from the upper standing wall 13 toward the lower standing wall 14 (standing wall) while sliding on the wall surface of the inner wall 12.

Since the slider 31 is displaced toward the lower standing wall 14, the slider 31 presses the crushing member 41.

When the load acting on the crushing member 41 via the slider 31 exceeds a set value, the crushing member 41 cannot withstand the load and crushes, absorbing the energy at the time of the collision.

In the case where a load from the outside of the vehicle continues to be inputted after the crushing member 41 crushed, the outer pillar B7 crushes to further absorb the energy of the impact.

In other words, the outer pillar B7 is set to crush after the impactor 21 moves.

Hence, crushing of the outer pillar B7 will not affect the action of the crushing mechanism 20.

Next, a description will be given of operational advantages of the vehicle body structure S1 according to the present embodiment.

Since the vehicle body structure S1 of the present embodiment includes the direction-changing unit 50, part of the force acting in the direction from the opening of the skeleton recessed portion 10 toward the inner wall 12 is converted into a force acting in the direction from the upper standing wall 13 toward the lower standing wall 14 (standing wall).

Then, the force acting in the direction from the upper standing wall 13 toward the lower standing wall 14 crushes the crushing member 41, which absorbs collision energy.

This action reduces the load acting on the inner pillar B6 (a skeleton member) and, in turn, reduces deformation of the inner pillar B6.

In summary, when an excessive load is inputted into the vehicle, this configuration can absorb the impact load while reducing displacement of the skeleton member B1 into the passenger compartment.

Thus, this configuration makes it possible to dispose a vehicle body structure S1 having a function of absorbing the load not only at the center pillar B5 but at a portion to which enough dimension (depth dimension) in the direction in which an external load is inputted cannot be allocated.

In addition, the vehicle body structure S1 of the present embodiment has the direction-changing unit 50 including an inclined surface obliquely intersecting the two directions (the movement direction of the impactor 21 and the movement direction of the slider 31).

Thus, the direction of transmitted force can be changed with this relatively simple configuration, which makes the action of the direction-changing unit 50 more reliable.

In addition, this simple configuration, which can change the direction of transmitted force, requires only a small space for the direction-changing unit 50.

This makes it possible to dispose the vehicle body structure S1 not only at the joint portion between the center pillar B5 and the side sill B4 but also at various parts in the vehicle body BD where enough depth dimensions cannot be allocated.

In addition, in the vehicle body structure S1 of the present embodiment, both the impactor 21 and the slider 31 have inclined surfaces (the impactor inclined surface 23 and the slider inclined surface 33).

The inclined surfaces are flat surfaces in sliding contact with each other without a gap in between.

This configuration increases the area of the sliding surface between the impactor 21 and the slider 31, reducing the surface pressure. Thus, it is possible to prevent malfunctioning such as biting, making the action of the direction-changing unit 50 more reliable.

In addition, in the vehicle body structure S1 of the present embodiment, the stiffness of the crushing member 41 is set to be lower than those of the impactor 21 and the slider 31.

This setting makes it more reliable for the slider 31 to crush the crushing member 41.

In the vehicle body structure S1 of the present embodiment, the upper standing wall 13 and the inner wall 12 are parts of the center pillar B5, and the lower standing wall 14 (standing wall) is part of the side sill B4.

With this configuration, the side sill B4, the stiffness of which is set to be higher in the skeleton member B1, receives and stops the load acting on the crushing member 41, making it more reliable for the slider 31 to crush the crushing member 41.

In addition, in the vehicle body structure S1 of the present embodiment, inside the tube of the side sill B4 at the part at which the lower standing wall 14 is located is provided a bulkhead B4a (see FIGS. 1 and 2).

In other words, the crushing member 41 is located on the side sill B4 at the position where the bulkhead B4a is located.

With this configuration, the crushing member 41 can be supported at a part the stiffness of which is higher than other parts in the side sill B4.

This configuration makes it more reliable for the movement of the slider 31 to crush the crushing member.

Although the bulkhead B4a of the present embodiment is a plate member the faces of which are directed in the vehicle front-rear direction and that is orthogonal to a horizontal plane, but the present invention is not limited to this example.

For example, the bulkhead B4a may be a plate member the faces of which are directed in the vehicle width direction and that extends in the vehicle front-rear direction and is orthogonal to a horizontal plane, and this configuration provides the same or similar operational advantages.

In the vehicle body structure S1 of the present embodiment, the stiffness of the inner pillar B6 is set to be at a degree approximately the same as that of the side sill B4. Since the stiffness of the inner pillar B6 is set to be high, the inner pillar B6 can support the side collision load acting on the slider 31 without being deformed, making the slider move downward.

In addition to the action of the crushing mechanism 20, a side collision load can be absorbed by the outer pillar being deformed, and this further reduces the degree of the inner pillar getting into the passenger compartment.

Although in the crushing mechanism 20 of the present embodiment, the impactor 21 is fixed to the outer member B9, the present invention is not limited to this example. A configuration in which the impactor 21 is not fixed to the outer member B9 is possible.

For example, an impactor 21, a slider 31, and a crushing member 41 included in a crushing mechanism 20 may be housed in one box-shaped case (not illustrated) as a unit to form a crushing unit (not illustrated).

In such a case, the crushing mechanism 20 is disposed in the skeleton recessed portion 10 in the form of a crushing unit, in which the impactor 21 is fixed on an inner surface of the box-shaped case.

With such a configuration, when a load is inputted from the outside, the outer member B9 crushes the box-shaped case, displacing the impactor 21 toward the inner wall 12.

The operation after the impactor 21 is displaced toward the inner wall 12 is the same as or similar to the operation in the foregoing first embodiment.

In addition, as another example, the impactor 21 may be disposed on the upper standing wall 13 to be slidable on the upper-standing-wall wall surface 13a in the vehicle inside-outside direction via a rail-like structure (not illustrated) or the like.

With such a configuration, in the case where a load is inputted from the outside, the outer member B9 pushes the impactor 21, and the pushed impactor 21 is displaced on the rail-like structure toward the inner wall 12.

Receiving the inputted load, the impactor 21 is displaced on the wall surface of the upper standing wall 13 in the direction from the opening of the skeleton recessed portion 10 toward the inner wall 12 (in a horizontal direction).

The impactor 21 being displaced toward the inner wall 12 seeks to move in an obliquely upper right direction in the figure because the impactor inclined surface 23 slides on the slider inclined surface 33.

However, the upward movement of the impactor 21 is restricted by the upper standing wall 13.

Thus, the impactor 21, due to the external load, moves toward the inner wall in a horizontal direction and pushes away the slider inclined surface 33 (the slider 31) downward.

The operation after the impactor 21 pushes away the slider 31 downward is the same as or similar to the operation in the foregoing first embodiment.

Figure 4:
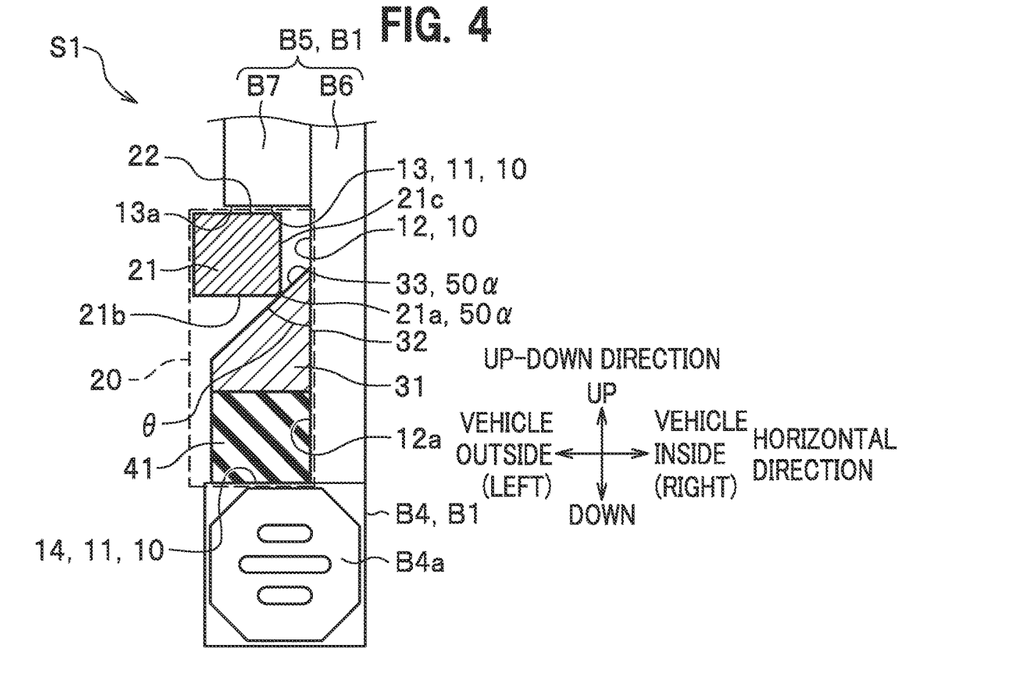
FIG. 4 is a cross-sectional view of a vehicle body structure of a first modified configuration, showing the plane corresponding to the cross-sectional view along line II-II in FIG. 1.

Next, a first modified configuration of the first embodiment of the present invention will be described in detail with reference to FIG. 4. In the description, the same constituents as in the first embodiment are denoted by the same symbols, and repetitive description thereof is omitted.

A vehicle body structure S1α of the first modified configuration is largely different from the vehicle body structure S1 of the foregoing first embodiment in terms of the configuration of direction-changing unit 50a.

The point is that in the direction-changing unit 50a of this configuration, the inclined surface obliquely intersecting the two directions, the displacement direction of the impactor 21 and the displacement direction of the slider 31, is provided on the slider 31 but not on the impactor 21.

In other words, the direction-changing unit 50a of this configuration includes the slider inclined surface 33 of the slider 31 and an impactor corner side 21a of the impactor 21. Since the slider inclined surface 33 has a configuration the same as or similar to the one in the first embodiment, description thereof is omitted.

The impactor corner side 21a is a corner formed by the inner-wall-side edge of an impactor lower surface 21b and the lower edge of an impactor inner surface 21c intersecting each other.

The impactor lower surface 21b is the opposite surface of the impactor 21 from the impactor sliding surface 22 and is a surface in parallel with the impactor sliding surface 22.

The impactor inner surface 21c is a surface connecting the inner-wall-side edge of the impactor sliding surface 22 and the inner-wall-side edge of the impactor lower surface 21b and in parallel with the inner-wall wall surface 12a.

In other words, the impactor 21 in this configuration has a rectangular parallelepiped shape.

With the configuration and action above, the vehicle body structure S1α according to this configuration provides operational advantages the same as or similar to those of the vehicle body structure S1 of the first embodiment.

Figure 5:
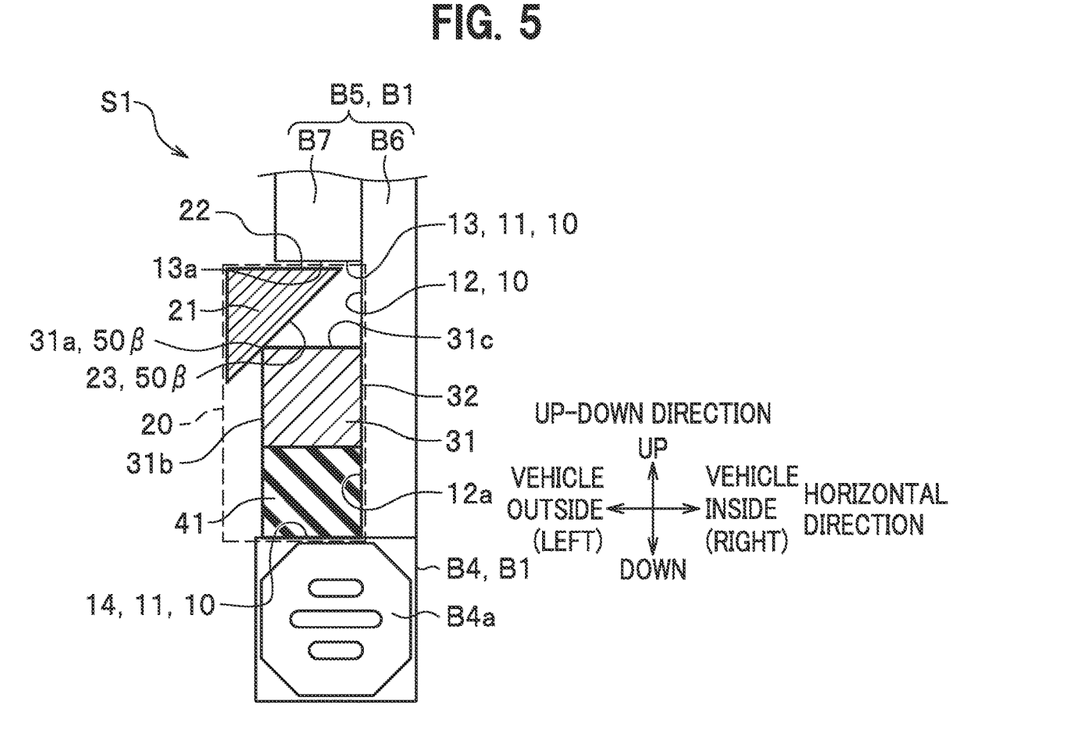
FIG. 5 is a cross-sectional view of a vehicle body structure of a second modified configuration, showing the plane corresponding to the cross-sectional view along line II-II in FIG. 1.

Next, a second modified configuration of the first embodiment of the present invention will be described in detail with reference to FIG. 5. In the description, the same constituents as in the first embodiment are denoted by the same symbols, and repetitive description thereof is omitted.

A vehicle body structure S1β of the second modified configuration is largely different from the vehicle body structure S1 of the foregoing first embodiment in terms of the configuration direction-changing unit 50β.

The point is that in the direction-changing unit 50β of this configuration, the inclined surface obliquely intersecting the two directions, the displacement direction of the impactor 21 and the displacement direction of the slider 31, is provided on the impactor 21 but not on the slider 31.

In other words, the direction-changing unit 50l3 of this configuration includes the impactor inclined surface 23 of the impactor 21 and a slider corner side 31a of the slider 31.

Since the impactor inclined surface 23 has a configuration the same as or similar to the one in the first embodiment, description thereof is omitted.

The slider corner side 31a is a corner formed by the upper edge of a slider outer surface 31b and the opening-side edge of a slider upper surface 31c intersecting each other.

The slider outer surface 31b is the opposite surface of the slider 31 from the slider sliding surface 32 and is a surface in parallel with the slider sliding surface 32.

The slider upper surface 31c is a surface connecting the upper edge of the slider sliding surface 32 and the upper edge of the slider outer surface 31b and in parallel with the lower standing wall 14.

In other words, the slider 31 in this configuration has a rectangular parallelepiped shape.

With the configuration and action above, the vehicle body structure S1β according to this configuration provides operational advantages the same as or similar to those of the vehicle body structure S1 of the first embodiment.

Figure 6:
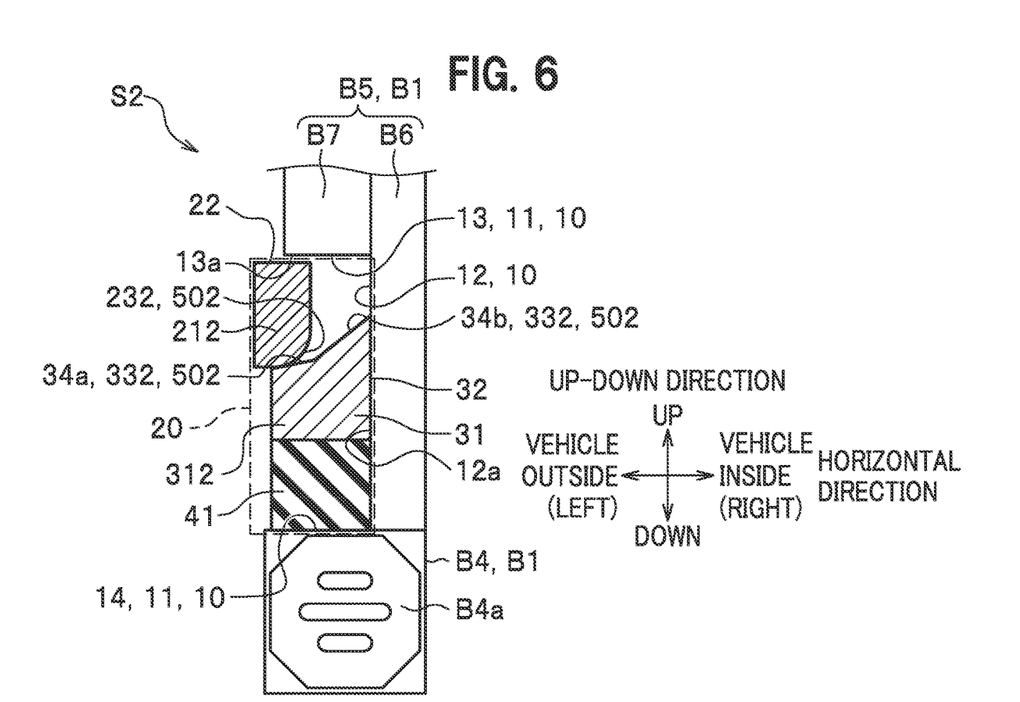
FIG. 6 is a cross-sectional view of a vehicle body structure of a second embodiment, showing the plane corresponding to the cross-sectional view along line II-II in FIG. 1.
Figure 7:
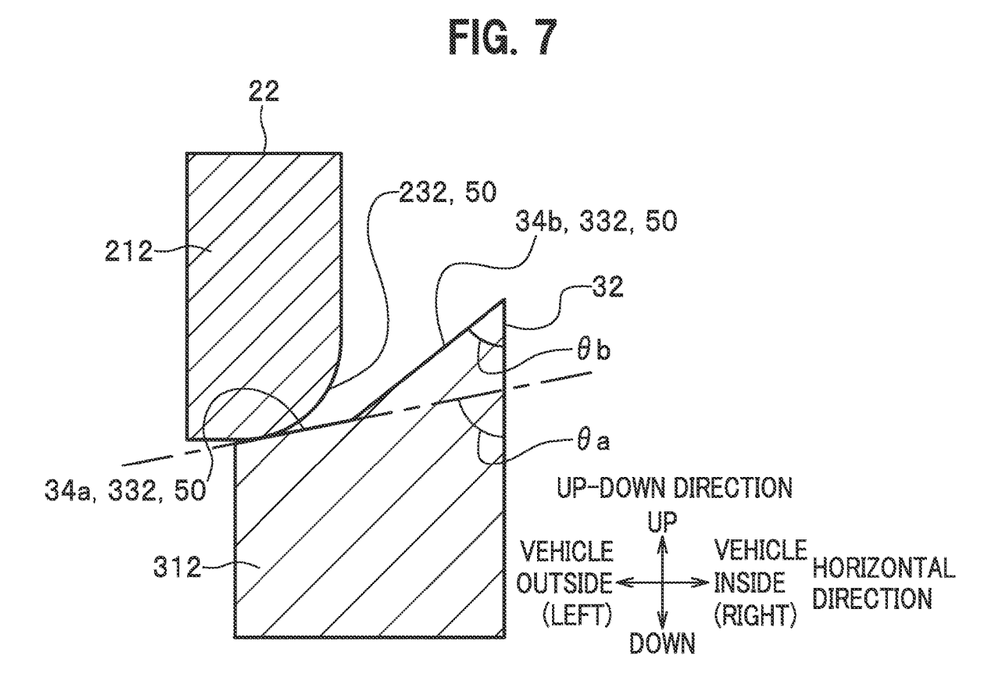
FIG. 7 is an enlarged view of an important part of FIG. 6.

Next, a second embodiment of the present invention will be described in detail with reference to FIGS. 6 and 7. In the description, the same constituents as in the first embodiment are denoted by the same symbols, and repetitive description thereof is omitted.

A vehicle body structure S2 of the second embodiment is largely different from the vehicle body structure S1 of the foregoing first embodiment in terms of the configuration of direction-changing unit 502, specifically, the configurations of an impactor inclined surface 232 and a slider inclined surface 332.

The impactor inclined surface 232 is not a flat surface but an arc surface that faces the slider inclined surface 332 and is convex toward the slider 312.

The slider inclined surface 332 has two flat surfaces having different inclination angles (a lead-in inclined surface 34a and a main inclined surface 34b).

In other words, the direction-changing unit 502 of the present embodiment includes flat inclined surfaces at one of the sliding-contact parts of the impactor 21 and the slider 31 configured to be in sliding contact with each other.

The lead-in inclined surface 34a is a portion of the slider inclined surface 332 on the opening side of the skeleton recessed portion 10.

Note that the angle formed by the lead-in inclined surface 34a and the slider sliding surface 32 is defined as a lead-in inclination angle θa.

The main inclined surface 34b is a portion of the slider inclined surface 332 on the inner wall 12 side.

In other words, the main inclined surface 34b is formed on the inner wall 12 side of the lead-in inclined surface 34a and continues from the lead-in inclined surface 34a.

Note that the angle formed by the main inclined surface 34b and the slider sliding surface 32 is defined as a main inclination angle θb.

The lead-in inclined surface 34a and the main inclined surface 34b are formed such that the lead-in inclination angle θa is larger than the main inclination angle θb.

(the lead-in inclination angle θa)>(the main inclination angle θb)

With the lead-in inclined surface 34a and the main inclined surface 34b, the slider inclined surface 332 has an approximately V-shaped cross section recessed in a direction away from the impactor 212.

Each of the lead-in inclined surface 34a and the main inclined surface 34b has a flat plane that obliquely intersects the two planes of the slider sliding surface 32 and the upper-standing-wall wall surface 13a and is in parallel with the line of intersection of these two planes. This point is similar to the configuration in the first embodiment.

In other words, each of the lead-in inclined surface 34a and the main inclined surface 34b has a plane that obliquely intersects the two directions, the direction in which a load is inputted from the outside and the direction of the load after the direction of the force is changed.

Thus, in the direction-changing unit 502 of the present embodiment, only the slider 312 has the inclined surfaces that obliquely intersects the two directions, the direction in which a load is inputted from the outside and the direction of the load after the direction of the force is changed.

Next, a description will be given of operational advantages of the vehicle body structure S2 according to the present embodiment.

In the vehicle body structure S2 of the present embodiment, the impactor inclined surface 232 is an arc surface convex toward the slider 312, and the slider inclined surface 332 includes two flat surfaces having different inclination angles.

The slider inclined surface 332 has an approximately V-shaped cross section recessed in a direction away from the impactor 212, formed by the lead-in inclined surface 34a and the main inclined surface 34b.

This configuration in the present embodiment not only provides the operational advantages of the first embodiment but also makes the downward movement of the slider 312 smoother, making it possible to crush the crushing member 41 more reliably.

Figure 8:
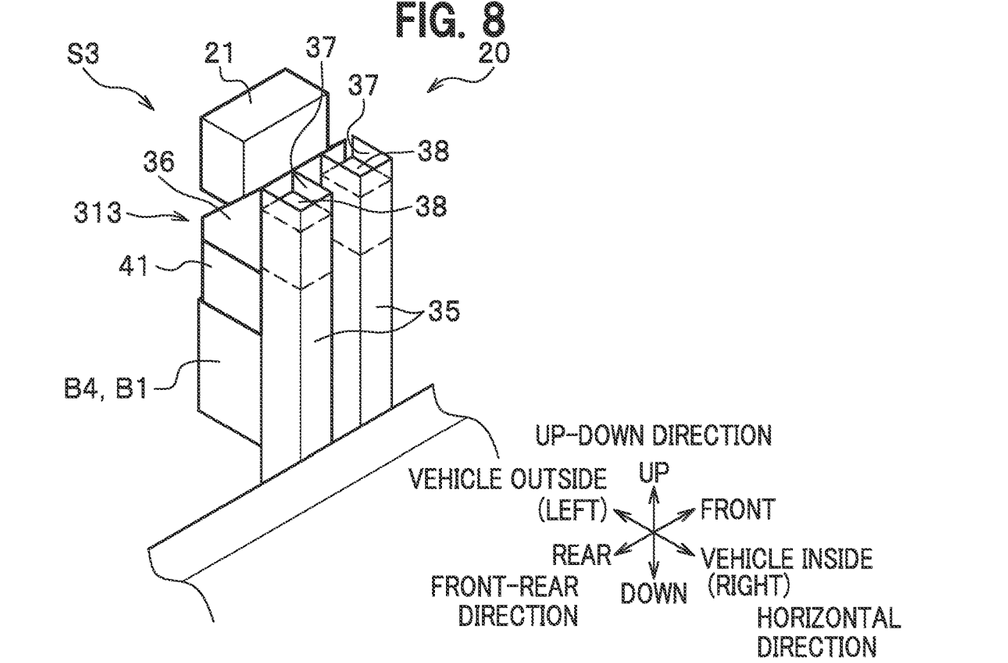
FIG. 8 is a cross-sectional view of a vehicle body structure of a third embodiment, showing the plane corresponding to the cross-sectional view along line II-II in FIG. 1.

Next, a third embodiment of the present invention will be described in detail with reference to FIG. 8. In the description, the same constituents as in the first embodiment are denoted by the same symbols, and repetitive description thereof is omitted.

A vehicle body structure S3 of the third embodiment is largely different from the vehicle body structure S1 of the foregoing first embodiment in terms of the configuration of a slider 313.

The slider 313 of the present embodiment includes slider brackets 35 and a slider body 36.

The slider brackets 35 are disposed on the inner-wall wall surface 12a.

The slider brackets 35 have a pair of sliding grooves 37 extending in parallel with each other so as to connect the upper standing wall 13 and the lower standing wall 14.

Each sliding groove 37 has an approximately U-shaped cross section and is oriented to be open toward the outside of the vehicle body.

The slider body 36, as with the slider 31 of the first embodiment, has a slider sliding surface 32 and a slider inclined surface 33 that form a wedge shape tapered toward the upper standing wall 13.

The slider sliding surface 32 has a pair of protruding sliding pieces 38.

The sliding pieces 38 are disposed in the respective sliding grooves 37, and each sliding piece 38 is movable within the sliding groove 37 in the extending direction of the sliding groove 37 without too much play in the front-rear direction in the groove.

Next, a description will be given of operational advantages of the vehicle body structure S3 according to the present embodiment.

In the vehicle body structure S3 of the present embodiment, the slider 313 includes the slider brackets 35 and the slider body 36.

The slider body 36 is movable relative to the slider brackets 35 in the extending direction of the sliding grooves 37 without too much play in the front-rear direction.

This configuration in the present embodiment not only provides the operational advantages of the first embodiment but also makes the downward movement of the slider body 36 smoother, making it possible to crush the crushing member 41 more reliably.

Figure 9:
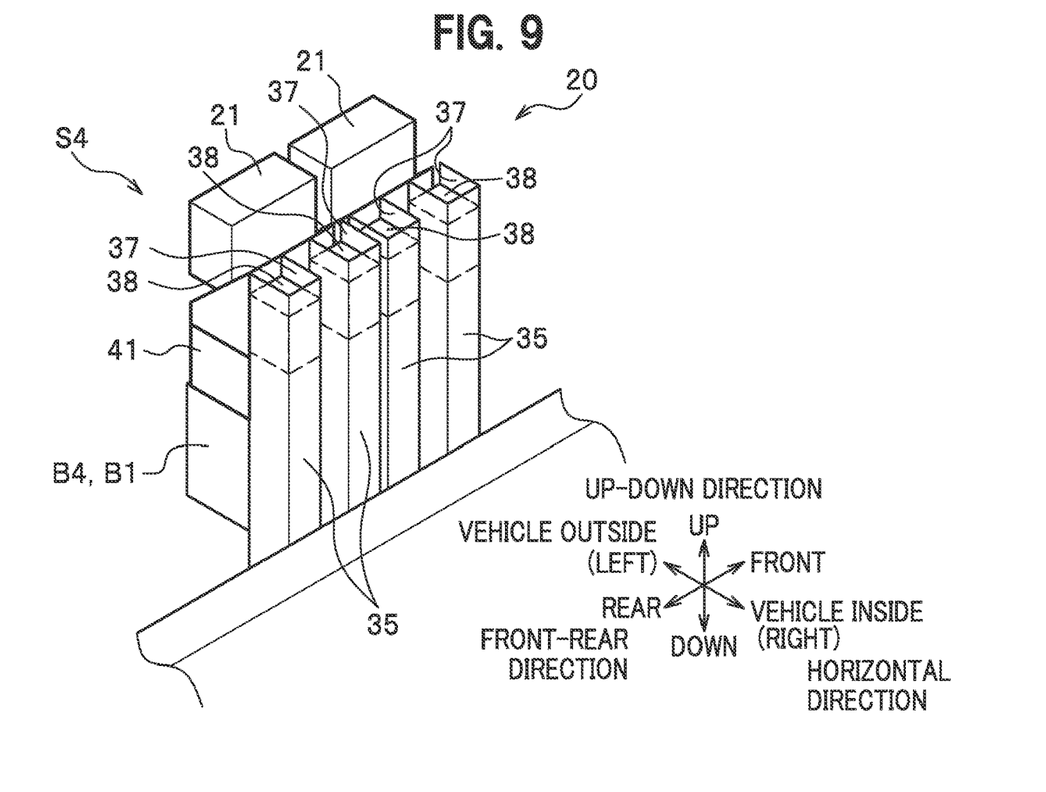
FIG. 9 is a cross-sectional view of a vehicle body structure of a fourth embodiment, showing the plane corresponding to the cross-sectional view along line II-II in FIG. 1.

Next, a fourth embodiment of the present invention will be described in detail with reference to FIG. 9.

The present embodiment is a modification example of the foregoing third embodiment.

Hence, in the description, the same constituents as in the third embodiment are denoted by the same symbols, and repetitive description thereof is omitted.

A vehicle body structure S4 of the fourth embodiment has two crushing mechanisms 20 each including the slider 313 in the foregoing third embodiment and arranged side by side in the front-rear direction in one skeleton recessed portion 10.

The two crushing mechanisms 20 are not linked to each other, and each crushing mechanism 20 operates separately.

Next, a description will be given of operational advantages of the vehicle body structure S4 according to the present embodiment.

In the vehicle body structure S4 of the present embodiment, the two crushing mechanisms 20 are arranged side by side in the one skeleton recessed portion 10 in the state where the two crushing mechanisms 20 can operate separately.

This configuration in the present embodiment not only provides the operational advantages of the third embodiment but also makes it possible to crush the crushing member 41 more reliably in the case where a collision occurs to the vehicle-body side surface from one of various directions.

For example, in the case where a collision occurs from a direction orthogonal to the vehicle-body side surface, both the two crushing mechanisms 20 work to absorb the collision load.

In the case where a collision occurs from a diagonally front direction to the vehicle-body side surface, one of the crushing mechanisms 20 to which the collision load is inputted first works first and then the other works to absorb the collision load.

Each of the crushing mechanisms 20, as described above, operates reliably regardless of the direction of collision.

Next, a fifth embodiment of the present invention will be described in detail with reference to FIGS. 10 and 11. In the description, the same constituents as in the first embodiment are denoted by the same symbols, and repetitive description thereof is omitted.

A vehicle body structure S5 of the fifth embodiment is largely different from the vehicle body structure S1 of the foregoing first embodiment in that the configuration of a crushing mechanism 205 is different.

The vehicle body structure S5 of the present embodiment includes a pair of sliders 31 and a pair of crushing members 41 for one impactor 215.

In other words, in the vehicle body structure S5 of the present embodiment, the two crushing mechanisms 205 are disposed in one skeleton recessed portion 10 so as to share the one impactor 215.

Each slider 31 and each crushing member 41 have the same specifications as in the first embodiment.

In the first embodiment, the slider 31 and the crushing member 41 are disposed only on the lower standing wall 14, but in the present embodiment, the slider 31 and the crushing member 41 are disposed both on the upper standing wall 13 (standing wall) and the lower standing wall 14 (standing wall).

In other words, in the present embodiment both the upper standing wall 13 and the lower standing wall 14 function as standing walls.

The skeleton recessed portion 10 has a recessed shape having an approximately L-shaped cross section, formed by the upper standing wall 13 (standing wall) standing along the vehicle inside-outside direction and the inner wall 12 connecting to the vehicle-inside edge of the upper standing wall 13.

In addition, the skeleton recessed portion 10 has a recessed shape having an approximately L-shaped cross section, formed by the lower standing wall 14 (standing wall) standing along the vehicle inside-outside direction and the inner wall 12 connecting to the vehicle-inside edge of the lower standing wall 14.

The impactor 215 is located between an upper slider 31U and a lower slider 31L.

The slider 31 (upper slider 31U) on the upper standing wall 13 and the slider 31 (lower slider 31L) on the lower standing wall 14 are oriented such that the tip ends of their wedge shapes face each other.

The configuration in which the crushing member 41 is located between each slider 31 and the corresponding opposing wall 11 is the same as or similar to the one in the first embodiment.

The impactor 215 has an impactor upper inclined surface 23U at a part facing the slider inclined surface 33 of the upper slider 31U (the upper-slider inclined surface 33U). The inclination angle of the impactor upper inclined surface 23U is set to be the same angle (inclination angle θ) as that of the upper-slider inclined surface 33U.

Thus, the impactor upper inclined surface 23U and the upper-slider inclined surface 33U are in sliding contact with each other without a gap in between.

The impactor 215 has an impactor lower inclined surface 23L at a part facing the slider inclined surface 33 of the lower slider 31L (the lower-slider inclined surface 33L).

The inclination angle of the impactor lower inclined surface 23L is set to be the same angle (inclination angle θ) as that of the lower-slider inclined surface 33L.

Thus, the impactor lower inclined surface 23L and the lower-slider inclined surface 33L are in sliding contact with each other without a gap in between.

The inclination angle of the impactor upper inclined surface 23U is set to be the same angle (inclination angle θ) as that of the impactor lower inclined surface 23L.

This is because the upper slider 31U and the lower slider 31L are designed according to the same specifications.

Next, a description will be given of the action of the vehicle body structure S5 of the present embodiment for a case where a side collision or the like inputs an excessive load into the vehicle body BD (see FIGS. 10 and 11).

Figure 10:
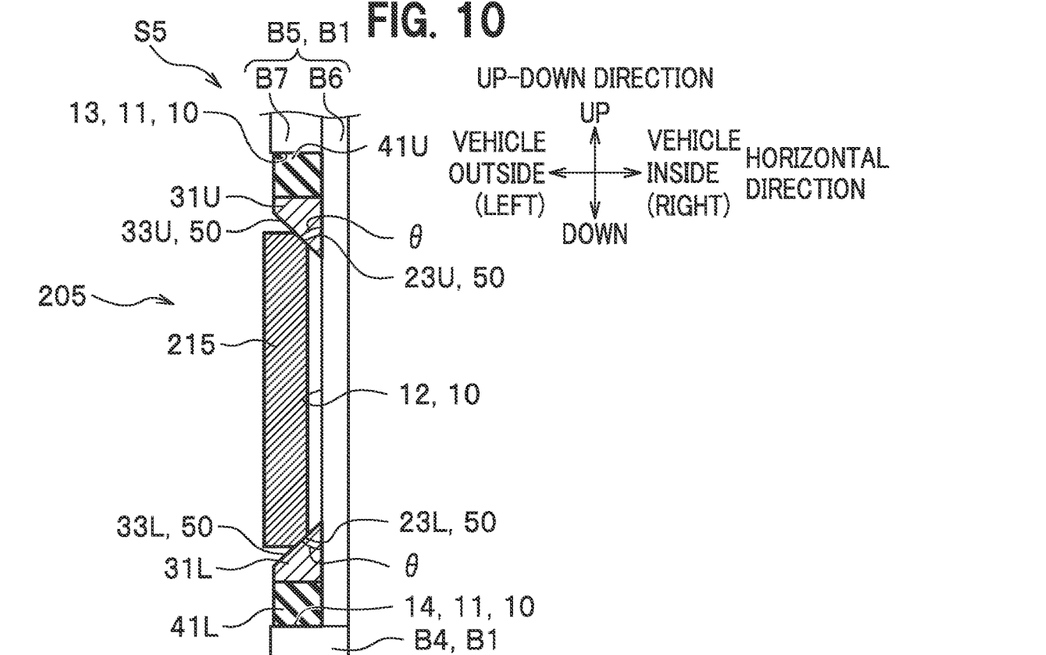
FIG. 10 is a cross-sectional view of a vehicle body structure of a fifth embodiment, showing the plane corresponding to the cross-sectional view along line II-II in FIG. 1.
Figure 11:
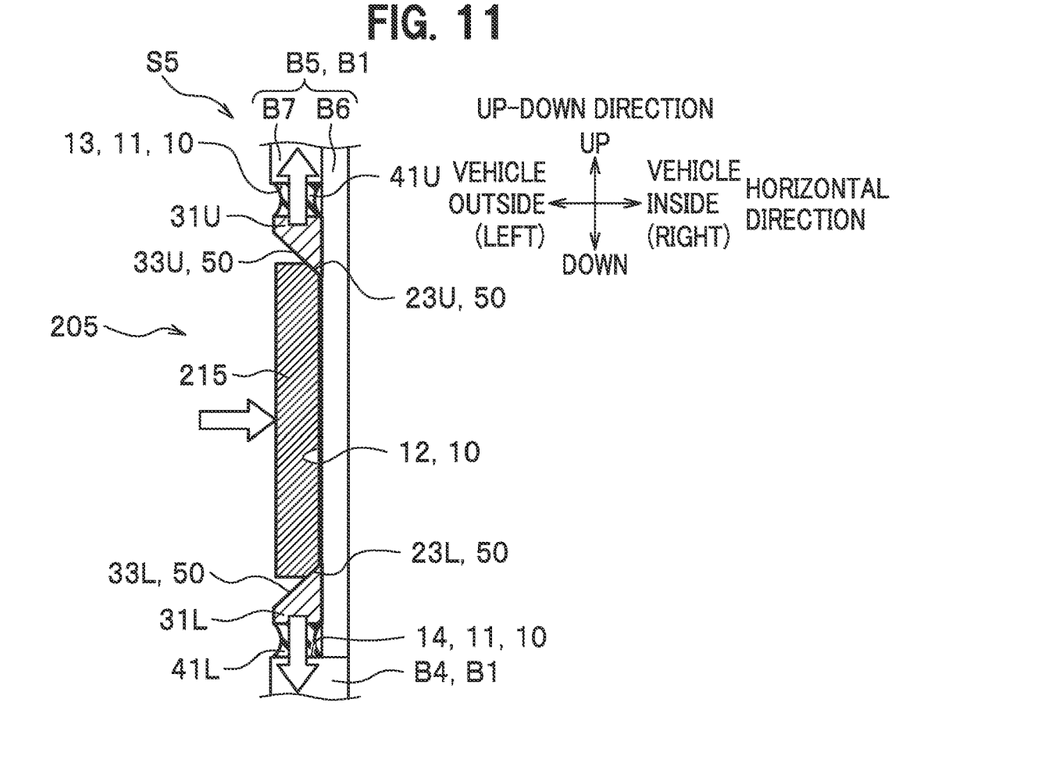
FIG. 11 is a cross-sectional view when an excessive load is inputted from the outside to the state in FIG. 10.

FIG. 10 illustrates the vehicle body structure S5 in the initial state.

Assume that a side collision or the like inputs an excessive load into the vehicle body structure S5 in the initial state as described above along a horizontal direction from the outside of the vehicle, from the left side to the right side in the figure (from the outside to the inside of the vehicle body).

The inputted load acts on the impactor 215.

Receiving the inputted load, the impactor 215 is displaced in the direction from the opening of the skeleton recessed portion 10 toward the inner wall 12 along the vehicle inside-outside direction.

When the impactor 21 is displaced toward the inner wall 12, the impactor upper inclined surface 23U slides on the upper-slider inclined surface 33U, and the impactor lower inclined surface 23L slides on the lower-slider inclined surface 33L.

Since the impactor upper inclined surface 23U slides on the upper-slider inclined surface 33U, the impactor 215 seeks to move obliquely in a right-down direction in the figure.

Since the impactor lower inclined surface 23L slides on the lower-slider inclined surface 33L, the impactor 215 seeks to move obliquely in a right-up direction in the figure.

However, the downward force acting via the impactor upper inclined surface 23U and the upward force acting via the impactor lower inclined surface 23L cancel each other.

This is because the inclination angle of the impactor upper inclined surface 23U is set to be the same angle (inclination angle θ) as that of the impactor lower inclined surface 23L.

Thus, the impactor 215, receiving the load from the outside, pushes away the upper-slider inclined surface 33U upward and pushes away the lower-slider inclined surface 33L downward while moving toward the inner wall in a horizontal direction.

Since the upper-slider inclined surface 33U is pushed away upward, the upper slider 31U is displaced in the direction from the lower standing wall 14 toward the upper standing wall 13 (standing wall) while sliding on the wall surface of the inner wall 12.

Since the lower-slider inclined surface 33L is pushed away downward, the lower slider 31L is displaced in the direction from the upper standing wall 13 toward the lower standing wall 14 (standing wall) while sliding on the wall surface of the inner wall 12.

The upper slider 31U being displaced toward the upper standing wall 13 presses the upper crushing member 41U.

The lower slider 31L being displaced toward the lower standing wall 14 presses the lower crushing member 41L.

When the load acting on each crushing member 41 via each slider 31 exceeds a set value, each crushing member 41 cannot withstand the load and crushes, absorbing the energy at the time of the collision.

With the configuration and action described above, the vehicle body structure S5 according to the present embodiment provides operational advantages the same as or similar to those in the vehicle body structure S1 of the first embodiment.

Next, a sixth embodiment of the present invention will be described in detail with reference to FIGS. 12 and 13. In the description, the same constituents as in the first embodiment are denoted by the same symbols, and repetitive description thereof is omitted.

A vehicle body structure S6 of the sixth embodiment is largely different from the vehicle body structure S1 of the foregoing first embodiment in terms of the configurations of a slider 316 and a direction-changing unit 506.

Note that the configuration in which the slider 316 is located between an impactor 216 and a crushing member 416 is the same as or similar to the one in the first embodiment.

About the slider 316, for example, the slider 31 of the first embodiment has an approximately wedge-like shape, and its slider sliding surface 32 is slidable on the inner-wall wall surface 12a.

Unlike the first embodiment, in the slider 316 of the present embodiment, the distance between the slider sliding surface 32 and the inner wall 12 increases along the direction from the lower standing wall 14 toward the upper standing wall 13.

Figure 12:
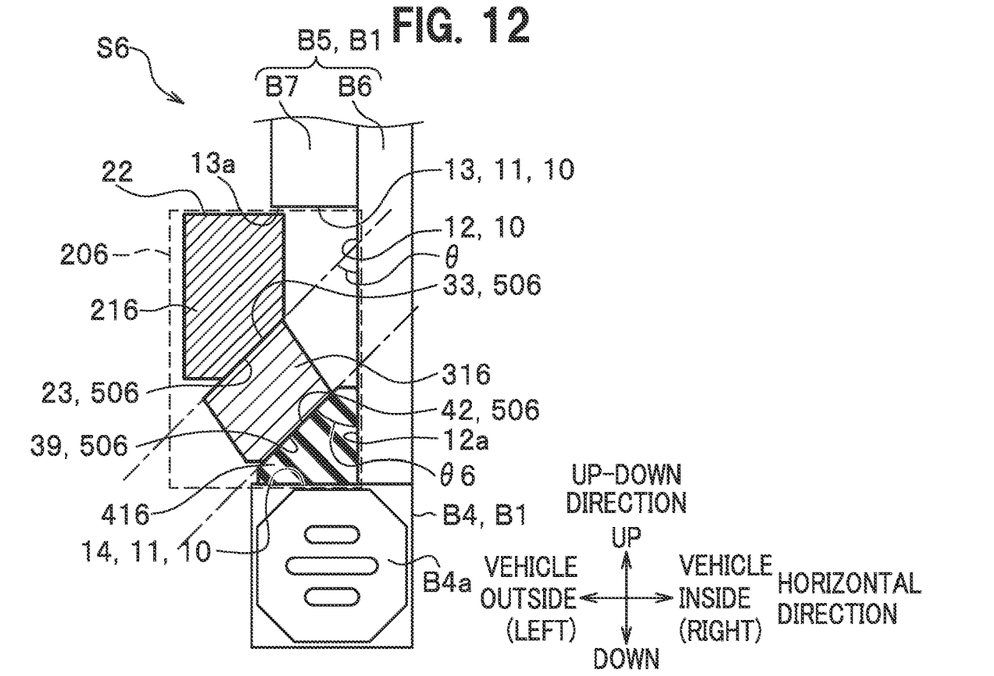
FIG. 12 is a cross-sectional view of a vehicle body structure of a sixth embodiment, showing the plane corresponding to the cross-sectional view along line II-II in FIG. 1.
Figure 13:
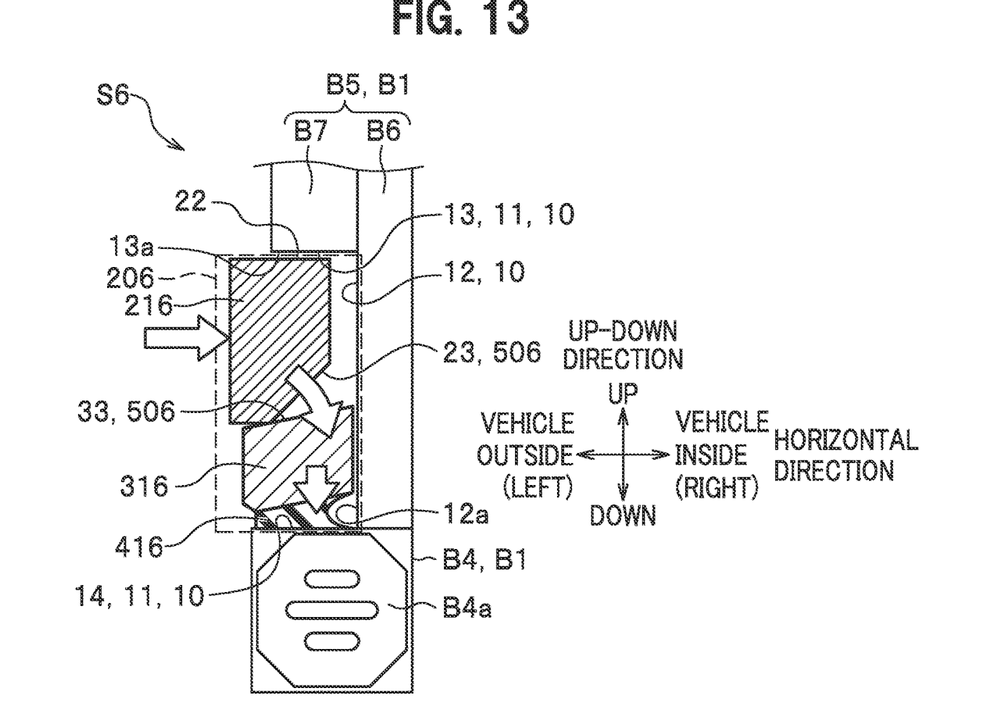
FIG. 13 is a cross-sectional view when an excessive load is inputted from the outside to the state in FIG. 12.

In other words, the slider sliding surface 32 has an inclined surface extending downward to the right in FIG. 12.

The slider 316 is disposed in the skeleton recessed portion 10 in a state where it is away from the inner wall 12 at a specified distance.

In addition, the slider 316 of the present embodiment is disposed on the crushing member 41 with its slider pressure-contact surface 39 fixed on a below-mentioned crushing-member pressure-contact surface 42 (pressure-contact inclined surface) in an integrated fashion.

The crushing member 41 is disposed at an approximately L-shaped recess formed by the lower standing wall 14 and the inner wall 12 in the skeleton recessed portion 10.

In other words, the slider 316 is disposed in the skeleton recessed portion 10 in a state where the movement from the outside to the inside in the vehicle inside-outside direction is restricted.

Next, a description will be given of the direction-changing unit 506 of the present embodiment.

The direction-changing unit 506 includes an impactor inclined surface 23 (inclined surface) and a slider inclined surface 33 (inclined surface) and also includes a slider pressure-contact surface 39 (pressure-contact inclined surface).

Since the impactor inclined surface 23, the slider inclined surface 33, and the impactor 216 have configurations the same as or similar to those in the first embodiment, description thereof is omitted.

The slider pressure-contact surface 39 (pressure-contact inclined surface), which is the opposite surface of the slider 316 from the slider inclined surface 33, has a flat surface in parallel with the slider inclined surface 33.

Specifically, in the state where a crushing mechanism 206 is disposed in the skeleton recessed portion 10, the angle $θ6S$ of the slider pressure-contact surface 39 relative to the inner-wall wall surface 12a is the same as the inclination angle θ of the slider inclined surface 33.

The crushing-member pressure-contact surface 42 (pressure-contact inclined surface) is the part of the crushing member 416 to which an external load is inputted.

In the state where the crushing mechanism 206 is disposed in the skeleton recessed portion 10, the angle $θ6$ of the crushing-member pressure-contact surface 42 relative to the inner-wall wall surface 12a is the same as the inclination angle θ of the slider inclined surface 33.

In other words, the crushing-member pressure-contact surface 42 has a flat surface in parallel with the slider inclined surface 33.

The slider pressure-contact surface 39 is in contact with the crushing-member pressure-contact surface 42 without a gap.

Next, a description will be given of the action of the vehicle body structure S6 of the present embodiment for the case where a side collision or the like inputs an excessive load into the vehicle body BD (see FIGS. 12 and 13).

Assume that a side collision or the like inputs an excessive load into the vehicle body structure S1 in the initial state along a horizontal direction from the outside of the vehicle, from the left side to the right side of the figure (from the outside to the inside of the vehicle body).

The inputted load acts on the impactor 216 via the outer member B9.

Receiving the inputted load, the impactor 216 is displaced on the wall surface of the upper standing wall 13 along a horizontal direction in the direction from the opening of the skeleton recessed portion 10 toward the inner wall 12 (the vehicle inside-outside direction).

The impactor 216 being displaced toward the inner wall 12 seeks to move in an obliquely upper right direction in the figure because the impactor inclined surface 23 slides on the slider inclined surface 33.

However, the upward movement of the impactor 216 is restricted because the impactor 216 is fixed on the outer member B9.

Thus, the impactor 216, due to the external load, moves toward the inner wall in a horizontal direction and pushes away the slider inclined surface 33 (the slider 316) downward.

Then, the slider 316 is pushed in toward the inner wall 12 by the impactor 216 while the slider inclined surface 33 is being pushed downward.

Here, since the slider pressure-contact surface 39 is fixed to the crushing-member pressure-contact surface 42, movement of the slider 316 toward the inner wall 12 is restricted.

Thus, the slider 316 rotates clockwise on a lower end portion of the slider 316 while being displaced in the direction from the upper standing wall 13 toward the lower standing wall (standing wall).

When the load acting on the crushing member 416 via the slider 316 exceeds a set value, the crushing member 416 cannot withstand the load and crushes, absorbing the energy at the time of the collision.

Next, a description will be given of operational advantages of the vehicle body structure S6 according to the present embodiment.

In the vehicle body structure S6 of the present embodiment, the slider 316 and the crushing member 416 are disposed in an integrated fashion with the slider pressure-contact surface 39 and the crushing-member pressure-contact surface 42, which are pressure-contact inclined surfaces, in between.

The pressure-contact inclined surfaces (the slider pressure-contact surface 39 and the crushing-member pressure-contact surface 42) are in parallel with the impactor inclined surface 23 and the slider inclined surface 33 which are inclined surfaces.

With the configuration described above, when a load is inputted, the slider 316 rotates while moving downward.

With this operation, the present embodiment not only provides the operational advantages of the first embodiment but also makes it possible to crush the crushing member 416 more (increases the degree of crushing) and thus to absorb the impact of collision.

Although in the direction-changing unit 506 of the present embodiment, the pressure-contact inclined surfaces (the slider pressure-contact surface 39 and the crushing-member pressure-contact surface 42) are in parallel with the inclined surfaces (the impactor inclined surface 23 and the slider inclined surface 33), the present invention is not limited to this example.

Figure 14:
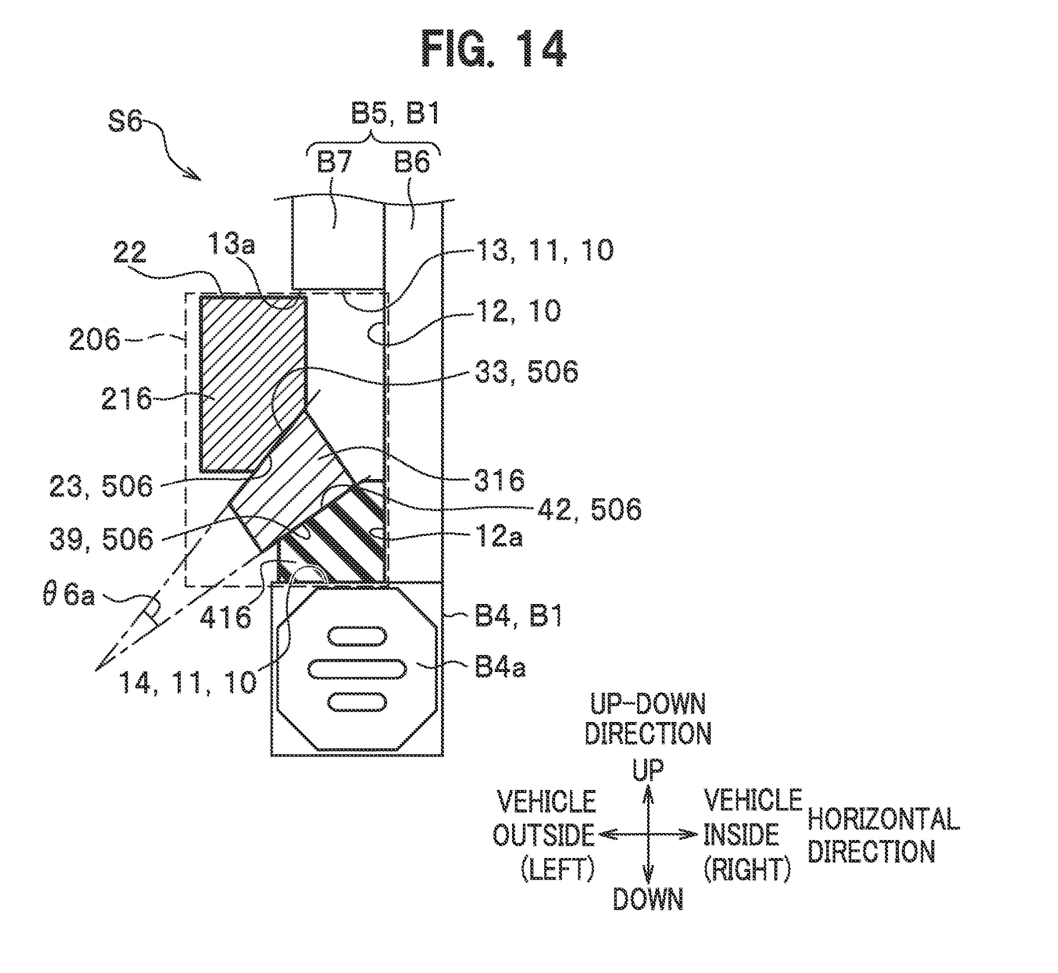
FIG. 14 is a cross-sectional view of a modification example of the sixth embodiment, showing the plane corresponding to the cross-sectional view along line II-II in FIG. 1.

For example, the inclined surfaces and the pressure-contact inclined surfaces may be formed such that the angle formed by the inclined surfaces and the pressure-contact inclined surfaces is acute as illustrated in FIG. 14.

A configuration in which the angle formed by the inclined surfaces and the pressure-contact inclined surfaces is acute also provides operational advantages the same as or similar to those in the present embodiment.

In addition, although in the vehicle body structure S6 of the present embodiment, the crushing member 416 is a box-shaped member having a closed cross section in vehicle top view, the present invention is not limited to this configuration.

For example, in a possible configuration, the crushing member 416 is formed to have an approximately U-shaped cross section, and the U-shape is oriented to be open toward the outside in the vehicle inside-outside direction in vehicle top view.

Forming the crushing member 416 to have an approximately U-shaped cross section makes crushing by the rotation of the slider 316 easier and provides additional operational advantages such as making it possible to reduce the weight of the crushing member 416.

What is claimed is:

1. A vehicle body structure comprising:
   a skeleton recessed portion that is formed on a surface of a skeleton member of a vehicle body by a standing wall standing along a vehicle inside-outside direction and an inner wall connecting to a vehicle-inside edge of the standing wall and has a recessed shape with an approximately L-shaped cross section;
   an impactor configured to be displaced in a direction from an opening of the skeleton recessed portion toward the inner wall;
   a slider configured to be displaced toward the standing wall and be in sliding contact with the impactor;
   direction-changing unit including an inclined surface at at least one of sliding-contact parts of the impactor and the slider configured to be in sliding contact with each other, the inclined surface obliquely intersecting the two directions of a displacement direction of the impactor and a displacement direction of the slider; and
   a crushing member disposed between the slider and the standing wall and configured to crush in a case where a load exceeding a set value is inputted to the crushing member,
   wherein
   the direction-changing unit includes, at a sliding-contact part between the slider and the crushing member configured to be in sliding contact with each other, a pressure-contact inclined surface that is in parallel with the inclined surface or obliquely intersects the inclined surface such that an angle formed by the pressure-contact inclined surface and the inclined surface is acute, and
   when a load acts on the impactor, the impactor moves toward the inner wall, and the slider rotates toward the crushing member by means of the direction-changing unit, and
   in a case where a load acting on the crushing member via the slider exceeds the set value, the crushing member is crushed by the moving slider.

2. The vehicle body structure according to claim 1, wherein
   the slider is configured to be displaced on the inner wall toward the standing wall and to be in sliding contact with the impactor, and
   when a load acts on the slider via the direction-changing unit, the slider moves along the inner wall toward the crushing member.

3. The vehicle body structure according to claim 1, wherein
   the crushing member is formed using a member having a closed cross section in vehicle top view, and
   the crushing member has a lower stiffness than the impactor and the slider.

4. The vehicle body structure according to claim 1, wherein
   the skeleton member includes:
     a side sill extending in a vehicle front-rear direction and
     a center pillar standing upward from the side sill,
   the center pillar includes the inner wall, and
   the side sill includes the standing wall.

5. The vehicle body structure according to claim 4, wherein
   the side sill is formed in the form of a tube and includes a bulkhead at a part in the tube at which the standing wall is located, and
   the bulkhead is formed using a plate member orthogonal to a horizontal plane.

6. The vehicle body structure according to claim 4, wherein
   the center pillar includes:
     an outer pillar serving as an outer portion in a vehicle width direction of the center pillar, and
     an inner pillar serving as an inner portion in the vehicle width direction of the center pillar, integrated with the outer pillar, and having a higher stiffness than the outer pillar, and
   the inner wall is on the inner pillar.

7. The vehicle body structure according to claim 1, wherein
   the impactor, the slider, and the crushing member compose a crushing mechanism, and
   a plurality of the crushing mechanisms are disposed in the same skeleton recessed portion such that sliding directions of the sliders are in parallel with one another.

8. The vehicle body structure according to claim 1, wherein the one impactor is configured to be in sliding contact with a plurality of the sliders, and a crushing member is disposed for each of the sliders.

9. A vehicle body structure comprising:

a skeleton recessed portion that is formed on a surface of a skeleton member of a vehicle body by a standing wall standing along a vehicle inside-outside direction and an inner wall connecting to a vehicle-inside edge of the standing wall and has a recessed shape with an approximately L-shaped cross section;

an impactor configured to be displaced in a direction from an opening of the skeleton recessed portion toward the inner wall;

a slider configured to be displaced toward the standing wall and be in sliding contact with the impactor;

direction-changing unit including an inclined surface at at least one of sliding-contact parts of the impactor and the slider configured to be in sliding contact with each other, the inclined surface obliquely intersecting the two directions of a displacement direction of the impactor and a displacement direction of the slider; and a crushing member disposed between the slider and the standing wall and configured to crush in a case where a load exceeding a set value is inputted to the crushing member, wherein when a load acts on the impactor, the impactor moves toward the inner wall, the slider moves toward the crushing member by means of the direction-changing unit, in a case where a load acting on the crushing member via the slider exceeds the set value, the crushing member is crushed by the moving slider, the skeleton member includes:

a side sill extending in a vehicle front-rear direction and a center pillar standing upward from the side sill, the center pillar includes the inner wall, and the side sill includes the standing wall.

10. The vehicle body structure according to claim 9, wherein the side sill is formed in the form of a tube and includes a bulkhead at a part in the tube at which the standing wall is located, and the bulkhead is formed using a plate member orthogonal to a horizontal plane.

11. The vehicle body structure according to claim 9, wherein the center pillar includes:

an outer pillar serving as an outer portion in a vehicle width direction of the center pillar, and an inner pillar serving as an inner portion in the vehicle width direction of the center pillar, integrated with the outer pillar, and having a higher stiffness than the outer pillar, and the inner wall is on the inner pillar.

* * * * *